United States Patent
Barrett

[11] 3,953,753
[45] Apr. 27, 1976

[54] THREE PHASE ALTERNATORS

[76] Inventor: Edward L. Barrett, 506 Malden Ave., LaGrange Park, Ill. 60525

[22] Filed: Jan. 20, 1975

[21] Appl. No.: 542,114

[52] U.S. Cl. .............................. 310/168; 310/198; 310/202; 310/184
[51] Int. Cl.² ...................................... H02K 19/20
[58] Field of Search .......... 310/168, 169, 170, 171, 310/180, 184, 185, 198–207, 263, 257, 67, 68, 68 D

[56] References Cited
UNITED STATES PATENTS

| | | | |
|---|---|---|---|
| 888,514 | 5/1908 | Lamme | 310/202 |
| 3,317,765 | 5/1967 | Cone | 310/168 X |
| 3,493,800 | 2/1970 | Barrett | 310/168 |

*Primary Examiner*—Donovan F. Duggan
*Attorney, Agent, or Firm*—Kinzer, Plyer, Dorn & McEachran

[57] ABSTRACT

A three-phase alternator, particularly suited for automotive use, having three stator winding sections each including a given number of coils, with each coil encompassing two stator poles and separated from the next coil in the section by an unwound pole. The rotor poles are of tapered construction, each having an effective width of two stator poles. In a preferred "brushless" construction, a D.C. excitation coil encompasses a tubular center leg of a stationary magnetic core of E-shaped cross-sectional configuration, with flux of one polarity going to the rotor partly through a shaft journalled in the center leg of the core and through a radial air gap of substantial surface area, and flux of the opposite polarity going to the rotor through a large-area radial air gap adjacent the outer flange of the core.

17 Claims, 10 Drawing Figures

Fig. 6. (CONVENTIONAL)

THREE PHASE ALTERNATORS

BACKGROUND OF THE INVENTION

Alternators are commonly employed as the basic source of electrical power in automotive vehicles; the alternator output is rectified and is used to charge the vehicle battery and to operate a wide variety of electrical devices incorporated in the vehicle. The size and weight of the alternator should be held to a minimum; the cost of the alternator is also a prime consideration. Even more important, perhaps, is the necessity for the alternator to operate with little or no attention over long periods of time because vehicle operators, particularly the owners of private passenger automobiles, frequently neglect maintenance procedures for extended periods.

The service requirements imposed upon an automotive alternator can be quite severe. The load on the machine may vary over wide extremes, depending upon the number of electrical devices on the vehicle currently in use (e.g., heater, air conditioner, radio, etc.). The temperature may range from well below 0°F. for a start on a cold winter morning to well over 200°F. when the vehicle is operated over an extended period on a hot day. Over all of these extremes of operating conditions, the alternator should exhibit fairly good self-regulation and should accommodate rapid changes in load, temperature, and other conditions.

The alternators employed in vehicles are usually three-phase machines. The stator winding ordinarily comprises three multi-coil sections; in each winding section, each coil encircles three stator poles. The coils of each section are connected in series with adjacent coils and the coils are often separated from each other by three stator poles that are not encircled by any coil of that section.

The rotary electromagnetic excitation structures of vehicle alternators are also reasonably well standardized. Thus, the excitation structure affords a series of alternate north and south rotor poles disposed concentrically with the stator and separated from the stator poles by a small air gap. The usual practice is to taper the rotor poles so that the narrow end of each rotor pole is approximately the width of one stator pole and the wide end is approximately as wide as three stator poles. With this tapered rotor pole construction, each rotor pole covers one full stator pole and somewhat less than one-half of each of two adjacent stator poles.

Most automotive alternators utilize a complete rotary excitation structure, including an excitation coil which rotates with the rotor, so that the exciting current for the coil must be applied through brush and slip-ring circuit connections. On the other hand, automotive alternators are occasionally of so-called "brushless" construction, in which the exciting coil is stationary so that the slip-rings and brushes can be eliminated. A brushless alternator affords substantial advantages with respect to elimination of the wear and maintenance problems almost inevitably associated with brushes and slip-rings. On the other hand, the brushless construction introduces an additional air gap or gaps into the magnetic structure of the alternator, with some reduction in efficiency, a reduction that may be sufficient to offset the advantages attained by elimination of brushes and slip rings.

An excellent example of a brushless alternator construction is set forth in Barrett U.S. Pat. No. 3,493,800, issued Feb. 3, 1970. The bearing arrangement shown in that patent, particularly in the embodiment illustrated in FIG. 10, affords superior performance for a variety of applications, and particularly in alternators used in vehicles. However, the magnetic structure is not as efficient as it might be, at least for some critical applications, due to losses in the air gaps between the rotor and the stationary portion of the magnetic excitation structure.

SUMMARY OF THE INVENTION

It is a principal object of the invention, therefore, to provide a new and improved three-phase dynamoelectric machine, particularly a three-phase alternator, suitable for use in vehicles and in similar demanding applications.

A particular object of the invention is to reduce the total amount of copper required for the windings of a three-phase alternator, or similar dynamoelectric machine, by a factor of as much as two or more, without reducing the over-all capacity of the machine, while at the same time obtaining an improvement in the self-regulation characteristics of the alternator. A specific feature of the invention of substantial importance in achieving this objective is the utilization of a three-phase winding in which each winding section comprises a series of coils in which each coil encircles just two stator poles, each coil in each section being separated from the next coil in the same section by an unwound stator pole, a pole that is not encompassed by any coil of that winding section.

Another object of the invention is to make more efficient use of the available magnetic flux, in a three-phase alternator or similar dynamoelectric machine, to thereby improve the overall capacity for a machine of given size and weight. A particular feature of the invention of substantial importance in realizing this objective is the provision of a rotor structure in which each rotor pole covers just two stator poles and is separated from the next adjacent rotor pole by a distance that effectively precludes overlapping alignment of two rotor poles of opposite polarity with any one stator pole and effectively minimizes flux leakage.

Another object of the invention is to increase the efficiency of operation of a "brushless" three-phase alternator by reducing the magnetic reluctance in the overall excitation structure and specifically by utilizing only large-area radial air gaps between the stationary and rotary portions of the excitation structure.

An additional object of the invention is to provide a new and improved three-phase alternator or like dynamoelectric machine, particularly suited for use in vehicles and other demanding applications, that is small in size, low in weight, and inexpensive to construct, that requires a minimum of maintenance, and that nevertheless affords good self-regulation for operation over a wide range of load conditions.

Accordingly, the invention relates to a three-phase dynamoelectric machine, of the kind comprising a rotor having two sets of oppositely polarized magnetic rotor poles interleaved with each other in an annular array, and a stator core of high-permeability magnetic material having a plurality of stator poles separated from each other by a corresponding plurality of stator slots, the stator poles forming an annular array concentric with the rotor poles and displaced therefrom by an air gap.

In accordance with one feature of the invention, the machine includes an electrical stator winding comprising first, second, and third winding sections, each winding section including a given number of electrically conductive coils mounted in the stator slots. Each coil encompasses two stator poles and is separated from the next adjacent coil in the same winding section by at least one stator pole not encompassed by a coil of that winding section. The three winding sections are angularly displaced around the stator core relative to each other.

In accordance with another feature of the invention, each rotor pole effectively covers just two stator poles, with no overlapping of two adjacent rotor poles with any one stator pole. Preferably, each rotor pole is of tapered construction, having a width W1 at one edge of the magnetic stator approximately equal to the total width of two stator poles and one slot, and having a width W2 at the other edge of the magnetic stator approximately equal to the total width of two stator poles and three slots, so that each rotor pole is in registry with a total stator pole area of appoximately two stator poles for any angular orientation of the rotor relative to the stator.

In a "brushless" construction, the alternator includes a stationary magnetic excitation core of E-shaped cross-sectional configuration, including a central tubular coil support, an integral base projecting radially from one end of the coil support, and an annular flange extending axially from the outer rim of the base in coaxial relation to the coil support, defining an annular coil-receiving cavity. An excitation coil is mounted on the coil support within the coil-receiving cavity; a rotatable shaft of magnetic material extends axially through and is journalled within the coil support. The rotor includes a first rotor member comprising a disc of magnetic material affixed to the end of the shaft opposite the base of the excitation core and having a plurality of radially projecting rotor poles. A second rotor member is mounted on the first rotor member by non-magnetic mounting means; the second rotor member comprises a continuous ring of magnetic material having a corresponding plurality of axially projecting rotor poles disposed in spaced interleaved relation, one-for-one, with the poles of the first rotor member. The ring of the second rotor member is concentrically aligned with the core flange across a large-area radial air gap.

DESCRIPTION OF THE PREFERRED EMBODIMENTS

Figure 1:
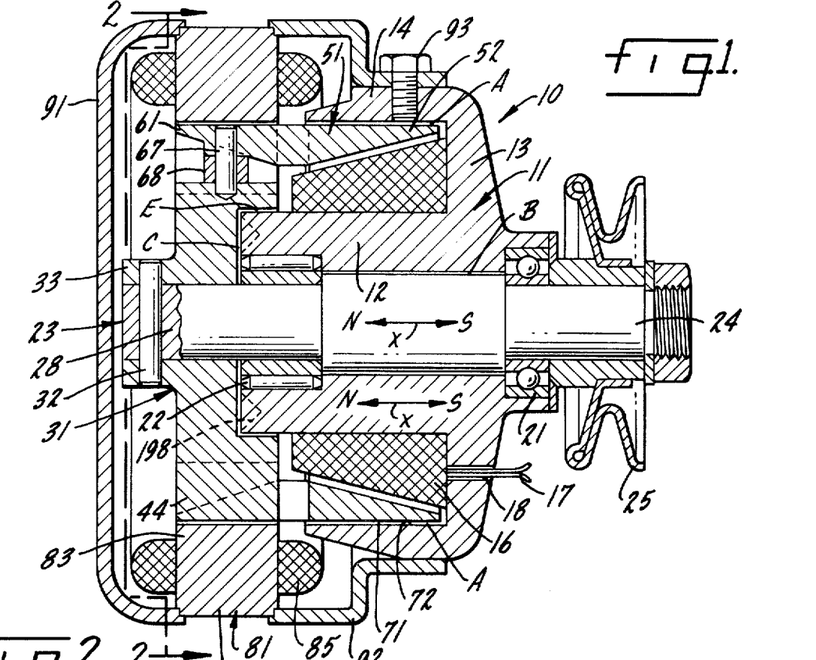
FIG. 1 is a longitudinal sectional elevation view of a three-phase alternator constructed in accordance with a preferred embodiment of the present invention.
Figure 2:
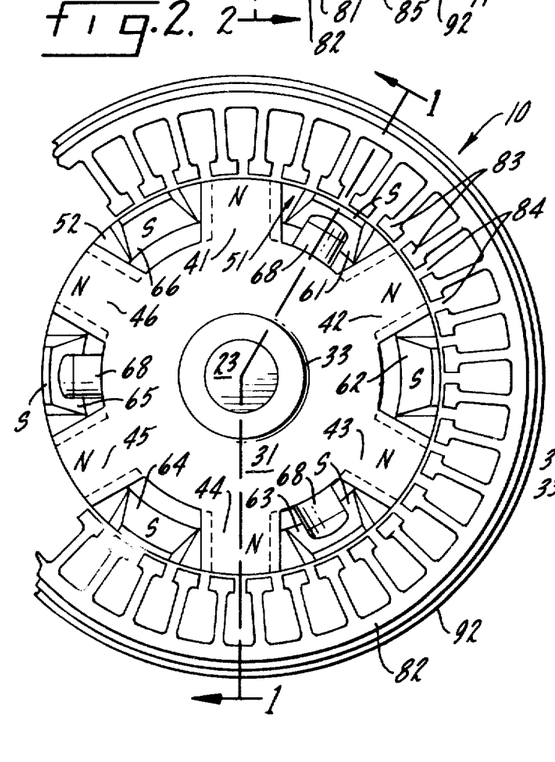
FIG. 2 is a transverse sectional elevation view taken approximately along line 2—2 in FIG. 1.
Figure 3:
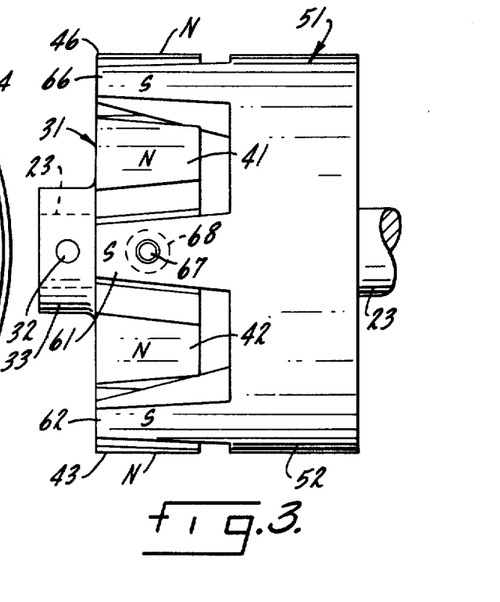
FIG. 3 is a side elevation view of the rotor for the alternator of FIGS. 1 and 2.

FIGS. 1, 2 and 3 illustrate the principal mechanical features of a three-phase "brushless" alternator 10 constructed in accordance with a preferred embodiment of the present invention.

Alternator 10 comprises a stationary magnetic excitation core 11 that is essentially E-shaped in cross-sectional configuration. Thus, core 11 comprises a central tubular coil support 12 with an integral base 13 extending radially from the right-hand end of coil support 12 as seen in FIG. 1. Core 11 further comprises an integral annular flange 14 which extends in an axial direction from the outer rim of base 13, in coaxial encompassing relation to the central tubular coil support 12. It is thus seen that the elements 12-14 of the stationary magnetic core 11 define an annular coil-receiving cavity 15 encircling the central coil support 12.

A DC excitation coil 16 is mounted in cavity 15. Coil 16 is supported on the central coil support 12 and is affixed thereto. External leads 17 for coil 16 may be brought out through a small hole 18 in the base 13 of core 11. There is no need for slip-rings or brushes in the excitation circuit for core 16, since core 11 and coil 16 remain stationary in operation of alternator 10.

Two bearings are mounted in the opposite ends of the central aperture of coil support 12. In alternator 10, these two bearings comprise a ball bearing 21 and a roller bearing 22. Other types of bearings can be used; at least one of the two bearings should be of a type that can take a thrust load. Bearings 21 and 22 are utilized to journal a rotatable drive shaft 23 in alternator 10, the shaft 23 extending axially through coil support 12. Shaft 23 is formed of magnetic material because it constitutes a part of the magnetic excitation structure, as described more fully hereinafter.

One end 24 of shaft 23 projects outwardly of core 11. A pulley 25 or other suitable drive connection is mounted on the projecting end 24 of shaft 23 to afford a means for rotating the shaft. Pulley 25 may be mounted on shaft extension 24 by any suitable means; in the illustrated construction, the pulley mounting arrangement includes a lock washer 26 and a retaining nut 27, nut 27 being threaded onto the outer end of shaft extension 24.

The magnetic excitation structure of alternator 10 includes a first rotor member 31. Rotor member 31 comprises a disc of magnetic material which is affixed to the end 28 of shaft 23 opposite the base 13 of excitation core 11. A press fit should be used between rotor member 31 and shaft end 28. Appropriate means may also be provided to positively prevent relative rotation between rotor member 31 and shaft 23; in the illustrated construction, the rotor member is pinned to the shaft by a pin 32 that extends through a hub 33 on the rotor member and through the end 28 of the shaft.

As best shown in FIGS. 2 and 3, rotor member 31 includes six integral, radially projecting rotor poles 41-46. The number of rotor poles is not critical, and may range from two to eight or even more. For many applications, however, a six-pole configuration for rotor member 31 is preferred.

Alternator 10 further comprises a second rotor member 51. Rotor member 51 includes a continuous ring 52 of magnetic material having a plurality of integral, axially projecting rotor poles 61-66 (see FIG. 2). This second set of rotor poles 61-66 corresponds in number to the first set 41-46. Furthermore, poles 61-66 are disposed in spaced interleaved relation, one-for-one, with the poles 41-46 of the first rotor member. Non-magnetic mounting means are provided for mounting the second rotor member 51 on the first rotor member 31 for rotation therewith. In the illustrated construction, this non-magnetic mounting means comprises a plurality of mounting pins 67 and spacers 68. Another mounting arrangement, that may be adopted for mass production purposes, comprises incorporation of the two rotor members 31 and 51 in a mold and subsequent die casting of a non-magnetic metal ring joining the two members in a single unitary rotor structure (see FIG. 8).

The continuous ring 52 of rotor member 51 is concentrically aligned with the core flange 14 across a large-area radial air gap A. The outer surface 71 of ring 52 and the inner surface 72 of flange 14 may be machined to only moderately close tolerances to avoid substantial variations in the air gap A. Because of the large area of air gap A, and the close, compact relation of the air gap and bearings 21 and 22, the machining tolerances are not so critical as to add materially to the cost of manufacture of alternator 10.

Alternator 10 further comprises a stator 81. Stator 81 includes an annular magnetic stator core 82 having a plurality of stator poles 83 projecting therefrom, the individual stator poles being separated from each other by a corresponding plurality of stator slots 84. An output winding 85, comprising three winding sections, is mounted in the slots 84 of stator core 82. The preferred output winding configurations, comprising one of the highly advantageous features of the invention, are described more fully hereinafter in connection with FIG. 5.

Stator 81 is fixedly mounted on the excitation core 11 in spaced concentric relation to the poles 41-46 and 61-66 of the two rotor members 31 and 51; this relationship is best illustrated in FIG. 2. As shown in FIG. 1, two housing members 91 and 92 are affixed to the magnetic core 82 of stator 81. Housing member 91 constitutes a cover for one end of alternator 10. Housing member 92, on the other hand, extends over and is secured to flange 14 of core 11, the illustrated arrangement comprising a plurality of mounting bolts 93.

Figure 4A:
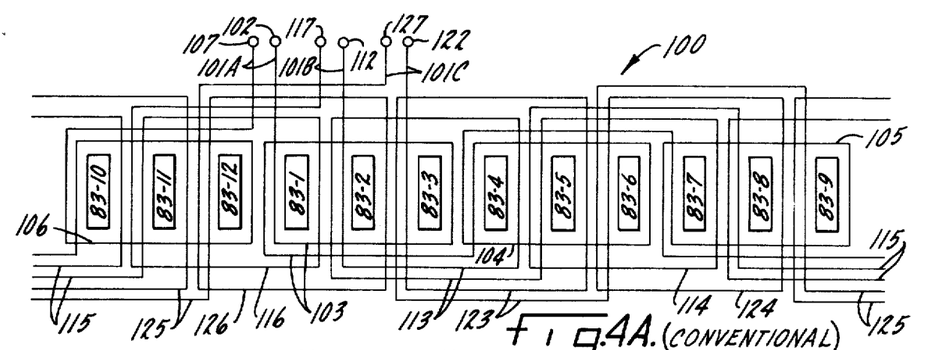
FIGS. 4A and 4B are schematic illustrations of two different conventional three-phase winding arrangements employed in alternators and similar dynamoelectric machines.

FIG. 4A illustrates one previously-known winding 100 that can be employed for the output winding of alternator 10 (FIG. 1), but is not the preferred construction for the output winding. In FIG. 4A, only twelve stator poles 83-1 through 83-12 have been illustrated, corresponding to the number of stator poles that would be used in a three-phase alternator having only four rotor poles. However, the winding sequence would be the same for the thirty-six stator poles of alternator 10.

The stator output winding 100 comprises three individual winding sections 101A, 101B and 101C. Winding section 101A begins at a terminal 102, from which a conductor extends to form a first coil 103 wound in a counterclockwise direction about stator poles 83-1 through 83-3. Section 101A continues with a second coil 104 wound in a clockwise direction around the next three stator poles 83-4 through 83-6. The next coil 105 in section 101A is wound in a counterclockwise direction around poles 83-7 through 83-9. The last coil in section 101A is the clockwise coil 106 encircling the last three stator poles 83-10 through 83-12; coil 106 and winding section 101A terminate at a terminal 107.

The second winding section 101B of stator winding 100 (FIG. 4A) begins at a terminal 112 and comprises a first counterclockwise coil 113 encircling poles 83-2 through 83-4. This is followed by a clockwise coil 114 encircling stator poles 83-5 through 83-7, a counterclockwise coil 115 around stator poles 83-8 through 83-10, and a clockwise coil 116 around stator poles 83-11 through 83-1, terminating at a terminal 117. The third phase winding 101C begins at a terminal 122 and comprises the series-connected alternately counterclockwise and clockwise coils 123, 124, 125 and 126, ending at a terminal 127. In the conventional winding 100, therefore, there are three winding sections 101A through 101C, each comprising a number of series-connected coils with each coil in each winding section encompassing three stator poles and with each coil wound in a direction opposite from the immediately adjacent coils in the section. The three stator windings 101A-101C are each displaced angularly by one pole, relative to the others, within the stator.

Figure 4B:
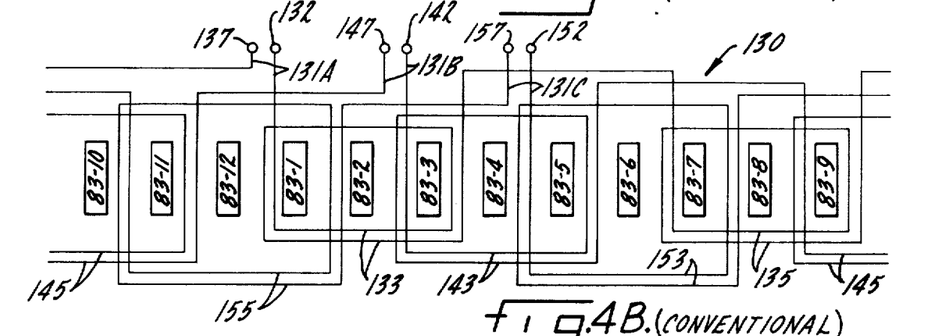

FIG. 4B illustrates another output winding 130 that is frequently used in automotive alternators and similar dynamoelectric machines, and that can be used in alternator 10 (FIG. 1), but that also does not constitute the preferred winding technique. The output winding 130 illustrated in FIG. 4B comprises three individual winding sections 131A, 131B and 131C. The first phase winding 131A begins at a terminal 132 and includes a first counterclockwise coil 133 encircling three stator poles 83-1 through 83-3. In this winding section, there is no coil that encompasses stator poles 83-4 through 83-6. Instead, the next coil in section 131A is another counterclockwise coil 135 that encircles stator poles 83-7 through 83-9. This winding section terminates at a second terminal 137.

The next output winding section 131B begins at a terminal 142 and comprises two counterclockwise-wound coils 143 and 145, connected in series; coil 143 encircles stator poles 83-3 through 83-5, and coil 145 encompasses poles 83-9 through 83-11. Section 131B ends at a second terminal 147. The third output winding section 131C is similar, and includes a first terminal 152, a coil 153 around stator poles 83-5 through 83-7, another series coil 155 encircling stator poles 83-11 through 83-1, and a second terminal 157. The output winding 130 of FIG. 4B allows some reduction in the amount of copper in the winding, as compared with the output winding 100 of FIG. 4A. However, it is not as efficient as the preferred winding constructions illustrated in FIG. 5.

Figure 5:
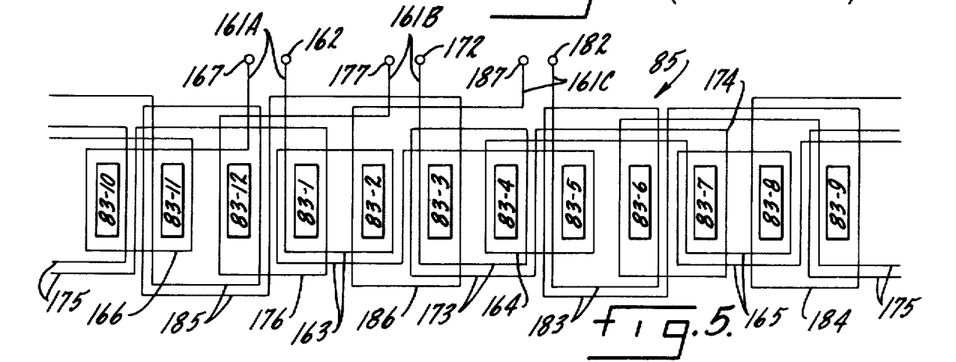
FIG. 5 is a schematic illustration of a stator winding for a three-phase alternator constructed in accordance with one feature of the present invention.

FIG. 5 illustrates a preferred construction for the output winding 85 of alternator 10, embodying one of the advantageous features of the invention. Winding 85 includes three individual winding sections 161A, 161B and 161C. Winding section 161A begins at a terminal 162, from which a conductor extends to form a first counterclockwise coil 163 encircling the stator poles 83-1 and 83-2. In this winding section, there is no coil around the next stator pole 83-3. Instead, the wire forming coil 163 extends past pole 83-3 and around poles 83-4 and 83-5 in a clockwise direction to form a second coil 164. From coil 164, winding section 161A extends past stator pole 83-6 and into a counterclockwise coil 165 encircling stator poles 83-7 and 83-8. The winding section then skips stator pole 83-9, the next coil being the clockwise coil 166 encircling stator poles 83-10 and 83-11. Winding 161A ends at a second terminal 167.

The second section 161B of winding 85 begins at a terminal 172 and extends into a first counterclockwise coil 173 encircling stator poles 83-3 and 83-4. In section 161B, pole 83-5 is skipped; the next coil in 161B is the clockwise coil 174 encircling stator poles 83-6 and 83-7. Stator pole 83-8 is skipped, in winding section 161B, and the next coil 175 is counterclockwise around stator poles 83-9 and 83-10. After passing pole 83-11, the last coil in winding section 161B is a clockwise coil 176 encircling poles 83-12 and 183-1, the winding section terminating at a terminal 177.

The third winding section 161C in winding 85, FIG. 5, starts with a terminal 182 and comprises alternately counterclockwise and clockwise coils 183, 184, 185 and 186. Coil 183 encircles stator poles 83-5 and 83-6; the remaining coils 184, 185 and 186 encompass the stator poles 83-8 and 83-9, 83-11 and 83-12, and 83-2 and 83-3, respectively. Section 161C ends at a terminal 187.

In the preferred winding construction 85 illustrated in FIG. 5, therefore, it is seen that the output winding of the alternator includes first, second and third winding sections with each winding section comprising a given number of series-connected electrically conductive coils. Each coil in each winding section encircles just two stator poles and is separated from the next adjacent coil in the same winding section by at least one stator pole which is not wound with a coil of that winding section. The individual winding sections are angularly displaced around the stator core relative to each other. In FIG. 5 (and in FIGS. 4A and 4B as well), it will be recognized that the coils are shown with a minimum number of turns; in actual construction, each coil usually includes additional turns.

For equal loads, in terms of output current, at any given speed and with virtually any given rotor structure, the output winding 85 illustrated in FIG. 5 affords some operating advantages as compared with either of the conventional windings illustrated in FIGS. 4A and 4B. The number of turns required for each coil, as compared with conventional windings, can be materially reduced. Furthermore, the effective area of the stator poles covered by the rotor poles of the alternator can be substantially increased, as described hereinafter in connection with FIG. 6 and FIGS. 7A and 7B, materially improving the magnetic efficiency of the alternator. The improved magnetic efficiency is directly reflected in improved performance of the alternator. Quantitative comparisons are set forth below.

Figure 6:
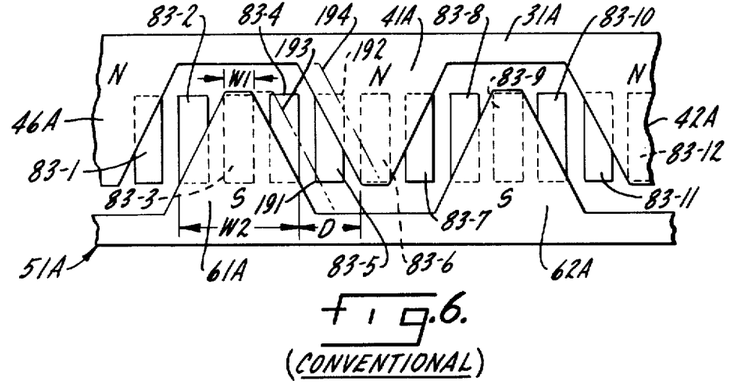
FIG. 6 is a schematic illustration of the related configurations for the rotor and stator poles most commonly used in conventional three-phase automotive alternators.

FIG. 6 illustrates a conventional rotor pole configuration that is usually used in conjunction with an output winding corresponding to either winding 100 (FIG. 4A) or winding 130 (FIG. 4B). As in FIGS. 4A through 5, only twelve stator poles are illustrated in FIG. 6, but these show the complete relationship.

In the construction shown in FIG. 6, a complete rotor pole 41A, which may be assumed to be a magnetic north pole, forming a part of one rotor member 31A, is illustrated in the top central portion of the figure. Parts of two adjacent poles 42A and 46A are also illustrated; these would also be north poles. The other rotor member 51A is also only partly shown, the illustrated portion comprising two rotor poles 61A and 62A, which would be south poles. Of course, the polarities of the rotor poles for rotor members 31A and 51A can be reversed with no change in operation.

As shown in FIG. 6, each of the rotor poles covers parts of three of the stator poles 83-1 through 83-12. Referring particularly to rotor pole 61A, it can be seen that it is of tapered construction and has a width W1 at one edge of the stator which is approximately equal to the width of one of the stator poles. As illustrated, rotor pole 61A is centered on stator pole 83-3. Rotor pole 61A has a width W2 at the other edge of the stator core that is equal to the total width of three stator poles and two stator slots. The circumferential distance D between adjacent rotor poles, such as the poles 41A and 61A, is equal to the total width of two stator slots and one stator pole.

With the construction illustrated in FIG. 6, each of the rotor poles, at any given time, is in alignment with a total stator pole surface area of only approximately one and two-thirds stator poles. Even so, there are rotor positions for which a single stator pole is covered by rotor poles of opposite polarity, shunting otherwise useful flux out of the stator. Thus, for the slightly altered rotor position shown by phantom lines 193 and 194, stator pole 83-5 has its corners 191 and 192 covered by rotor poles 61A and 41A, respectively. All resulting flux in stator pole 83-5 is effectively lost; the stator pole constitutes a magnetic shunt for this flux. Widening of the rotor poles increases this magnetic short circuit problem. Narrowing the rotor poles would eliminate the overlap problem, but further reduces the total stator pole area covered by each rotor pole at any given instant, and hence reduces the overall magnetic efficiency of the alternator.

Figure 7A:
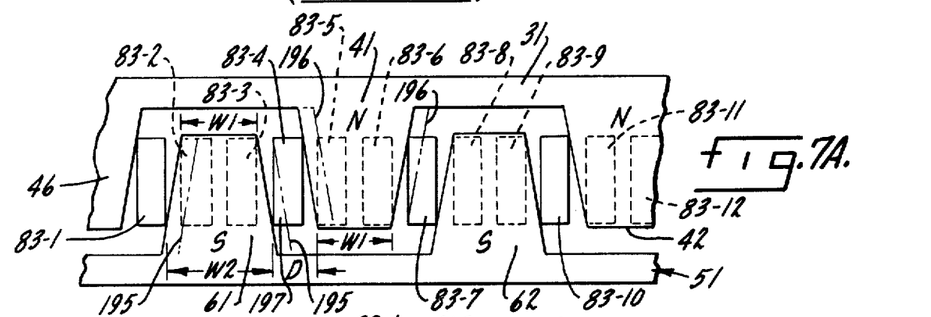
FIGS. 7A and 7B are schematic illustrations of the related configurations for the rotor and stator poles for alternators constructed in accordance with another feature of the present invention.

FIG. 7A illustrates a rotor pole configuration constituting another of the advantageous features of the invention. This rotor pole construction can be used with some benefit in conjunction with a conventional stator winding, such as the windings 100 and 130 (FIGS. 4A,4B). However, the benefits of the invention are much more apparent when the rotor configuration of FIG. 7A is combined with the improved winding 85 (FIG. 5) of the invention.

In the preferred construction shown in FIG. 7A, one complete rotor pole 41, which may again be assumed to be a magnetic north pole, forming a part of rotor member 31, appears in the top central portion of the figure, flanked by parts of two adjacent poles 42 and 46. The part of the other rotor member 51 shown in FIG. 7A comprises two rotor poles 61 and 62, which would be south poles.

In the rotor alignment shown in FIG. 7A, each of the rotor poles covers just two stator poles. Each rotor pole is of tapered construction; the narrower rotor pole width W1 at one edge of the stator is approximately equal to the width of two stator poles plus one slot. The wider width W2 of each rotor pole, at the other edge of the stator core, is equal to the total width of two stator poles and three stator slots. The circumferential distance D between adjacent rotor poles, such as poles 41 and 62, is equal to the total width of one stator slot and one stator pole.

With the construction illustrated in FIG. 7A, each rotor pole, at any given time, is in alignment with a total stator pole surface area of two full stator poles. Further, there are no rotor positions for which a single stator pole is covered by rotor poles of opposite polarity. Thus, for the slightly altered rotor position shown by phantom lines 195 and 196, stator pole 83-4 has its corner 197 covered by rotor pole 61, but pole 41 has moved well away from this stator pole. There are no substantial magnetic shunts for this flux in the rotor-stator circuit, regardless of rotor alignment.

Figure 7B:
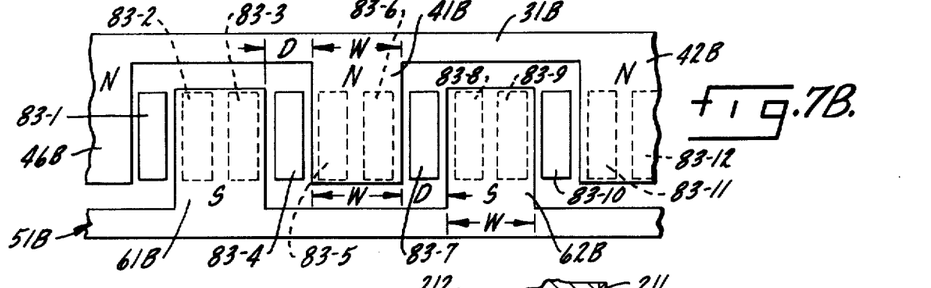

An alternate construction for the rotor poles is shown in FIG. 7B. The rotor member 31B includes a series of magnetic rotor poles 41B-46B (only poles 41B, 42B and 46B are shown), each of a constant width W which is equal to or slightly larger than the total width of two stator poles plus one stator slot. The rotor pole width W should be maintained less than the total width of two stator poles and two stator slots. The rotor poles 61B, 62B, etc. of the other rotor member 51B are also of constant width W. The circumferential distance D between adjacent rotor poles is at least equal to and preferably slightly larger than the total width of one stator pole and one stator slot. The sum of W plus D should be equal to the total width of three stator poles plus three stator slots, the same as the average for W1+D and W2+D in FIG. 7A.

The alternate pole configuration of FIG. 7B retains the high magnetic efficiency of the construction shown in FIG. 7A. However, the rectangular pole construction of FIG. 7B tends to be somewhat noisier than the tapered construction of FIG. 7A. Of course, configurations intermediate those of FIGS. 7A and 7B can be employed.

In considering operation of alternator 10 (FIGS. 1–3) it may be assumed that a DC excitation voltage is applied to coil 16 through the external leads 17. With coil 16 energized, a magnetic flux is generated in the central tubular coil support 12 and in shaft 23, as indicated by arrows X, with the indicated polarity. Of course, if the polarity of the DC excitation to leads 17 is reversed, the polarity of the magnetic flux is reversed, with no change in performance.

For one polarity, some of the flux from coil support 12 passes across a large-area radial air gap B to shaft 23. From shaft 23, the flux path extends through rotor member 31 to its poles 41-46. Another principal flux path to poles 41-46 extends across a low-reluctance radial air gap E. There is also an axial gap C traversed by flux of the same polarity, but this axial gap is preferably of high reluctance to preclude excessive axial loading of the bearings; an annular groove 198 may be formed in the face of coil support 12 for this purpose.

For the poles 61-66 of rotor member 51, the flux path extends through base 13 and flange 14 of core 11 and across the large-area radial air gap A to the ring portion 52 of the second rotor member 51. Because gap A is very large in area, the reluctance of this flux path is quite low, comparable to that of the total flux path for rotor member 31. Accordingly, a high efficiency is maintained for the complete magnetic excitation system. With the illustrated construction, even though alternator 10 is a "brushless" alternator and includes additional air gaps as compared with a more conventional construction, the magnetic efficiency is high enough so that performance comparable to conventional brush-type alternators can be achieved.

In alternator 10, FIGS. 1-3, the relative configuration and alignment of the rotor poles and the stator poles preferably conforms to the construction illustrated in FIG. 7A; the construction of FIG. 7B may also be used. With either arrangement, each rotor pole is always aligned with a total effective stator pole surface area of two stator poles. This affords a substantial improvement in magnetic efficiency as compared with the more conventional pole configuration illustrated in FIG. 6, in which each rotor pole only covers a stator pole area of approximately one and two-thirds poles. Assuming that the rotor members are maintained in saturated condition, during operation, as is usually the case, it can be shown that an improvement in magnetic efficiency of approximately twenty percent is readily attained.

Furthermore, in alternator 10 the stator winding 85 conforms to the construction illustrated in FIG. 5, in which each winding section includes a series of conductive coils with each coil encompassing just two stator poles and with each coil separated from the next coil in the winding section by a stator pole that is not encircled by a coil of that winding section. The winding of FIG. 5, when compared with conventional stator windings as shown in FIGS. 4A and 4B, also affords substantial operational advantages. The stator coils are substantially shorter than the coils of a conventional winding, since they encompass only two poles instead of three poles. This results in a material reduction in the total amount of copper (or aluminum) in the stator winding, and also affords an appreciable reduction in the winding resistance, thereby improving self-regulation. Even disregarding the reduction in resistance with only the shortened coil length taken into account, the reduction in the amount of copper required is approximately twenty percent. Moreover, the reduction in resistance usually makes it possible to use fewer turns in the stator winding coils, so that the overall reduction in copper may be of the order of thirty percent or more.

To test the invention, a standard commercial automotive alternator was compared directly with two similar alternators each constructed in accordance with the invention and each utilizing the pole configuration illustrated in FIG. 7A together with the winding configuration shown in FIG. 5. In constructing each of the test alternators incorporating the features of the invention, the stator core used was the same as that of the commercial alternator. In the winding of one test alternator, the coils of each winding section were alternated, with four turns in one coil and five turns in the adjacent coil, as compared with ten turns per coil in the commercial stator, which utilized the winding configuration of FIG. 4B. In the other test alternator, the coils of each winding section included three turns in one coil, four turns in the next coil. Thus, in the first test alternator there were 54 turns per winding section and 162 turns overall; the second test alternator had 42 turns per winding section and a total of 126 turns for the complete winding. This is compared with the commercial configuration of 60 turns per winding section and 180 turns overall. The excitation windings for all of the alternators were the same; the standard brush and slip-ring exciting configuration of the commercial machine was employed. The results of a load test at 1530 rpm were as follows:

TABLE I

| Alternator | LOAD TEST AT 1530 RPM | | | | | |
| --- | --- | --- | --- | --- | --- | --- |
| | Field (volts) | Batt. Load (amps) | Lamp Load (amps) | Total Load (amps) | Output volts | Output Watts |
| Commercial First Test | 10.5 | 5.0 | 21.4 | 26.4 | 13.5 | 356 |
| Alt. (4T/5T) | 10.5 | 15.0 | 23.0 | 38.0 | 14.5 | 547 |

TABLE I-continued

| Alternator | LOAD TEST AT 1530 RPM | | | | Output volts | Output Watts |
|---|---|---|---|---|---|---|
| | Field (volts) | Batt. Load (amps) | Lamp Load (amps) | Total Load (amps) | | |
| Second Test Alt. (3T/4T) | 10.5 | 28.0 | 9.7 | 37.7 | 14.4 | 542 |

Another load test was conducted, using the commercial alternator and the second (3T/4T) test alternator, at a much higher speed, with the results shown in Table II. The first test alternator (4T/5T) was not employed in this test because it had burnt out all of the lamps in the lamp load when operated with a full 14.4 ampere field coil current.

TABLE II

| Alternator | LOAD TEST AT 5230 RPM | | | | Output volts | Output Watts |
|---|---|---|---|---|---|---|
| | Field (volts) | Batt. Load (amps) | Lamp Load (amps) | Total Load (amps) | | |
| Commercial | 12.75 | 8 | 48.7 | 56.7 | 12.75 | 723 |
| Second Test Alt. (3T/4T) | 14.4 | 20 | 55 | 75 | 14.4 | 1080 |

In the test of Table II, the field voltage to the commercial alternator was limited only by its own output; the circuits employed and the drives used were the same for both alternators. The drive unit was a 1.5 horsepower electric motor. The circuit breaker for the motor opened shortly after completion of the readings for the test alternator, but did not open during the test of the commercial alternator, affording another indication of the greater capacity of the test machine.

No-load tests were also conducted, using the same alternators, with the results shown below:

TABLE III

| | NO LOAD TEST AT 1530 RPM | | |
|---|---|---|---|
| Field (volts) | Output VOlts | | |
| | Commercial | 4T/5T First Test Alt. | 3T/4T Second Test Alt. |
| 4 | 23 | 25 | 17.3 |
| 6 | 30 | 28 | 20.7 |
| 8 | 36 | 28.75 | 21.75 |
| 10 | 38 | 29.5 | 22.25 |
| 12 | 40.25 | 30 | 22.5 |
| 13 | 41 | 30.25 | 22.75 |
| 14 | 41.25 | 30.5 | 23 |
| 14.5 | 41.35 | 30.5 | 23.1 |

These test clearly demonstrate the substantial improvement in self-regulation for the test alternator incorporating the stator winding and rotor pole features of the invention. The voltage drop in each of the test alternators is materially smaller; these alternators will run at a considerably lower temperature for a given power output.

For a rough but useful comparison, the 1530 RPM load test at 10.5 volts field excitation may be considered in conjunction with the no-load test at the same speed with 10 volts on the field. The commercial alternator dropped from 38 volts output no-load to 13.5 volts at a load of 26.4 amperes, a total drop of 24.5 volts. The first (4T/5T) test alternator constructed according to the invention shows a drop from 29.5 volts output no-load to 14.5 volts with a 38 ampere load, a differential of only 15 volts. The second test alternator (3T/4T) goes from 22.25 volts for the no-load output to 14.4 volts with a 37.7 ampere load, a drop of just 7.85 volts. The comparisons are not exact, due to the differences in field coil voltage, but the field voltage variation is the same for all three machines and the greatly improved self-regulation of the test alternators is readily apparent.

In the brushless construction of FIGS. 1–3, the excitation core flange 14, which affords the large radial air gap A, provides improved magnetic performance without entailing a material increase in the overall size of the alternator. The low reluctance of gap A cannot be effectively duplicated in a construction using an axial air gap. Unlike most alternators, stator 81 is not centered over excitation coil 16 but is offset axially relative to the excitation structure. This makes it possible to keep the overall diameter of the alternator to a minimum but does not add materially to the total axial length of the alternator.

Figure 8:
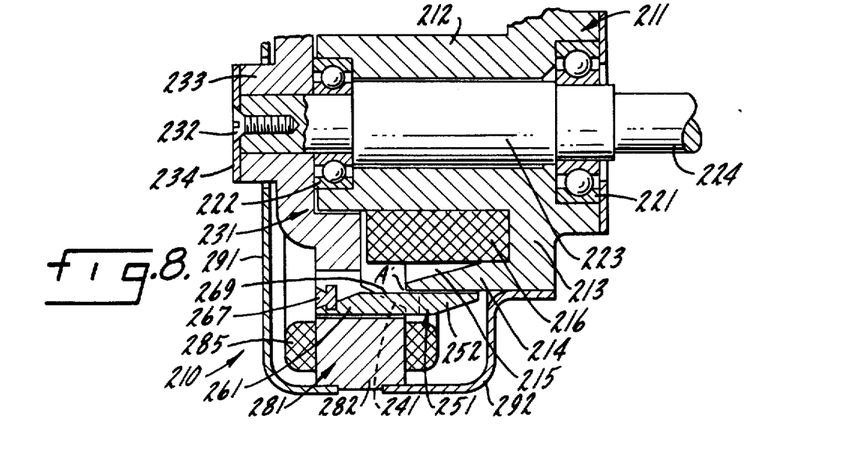
FIG. 8 is a longitudinal sectional elevation view of an alternator, similar to FIG. 1, illustrating a modification of the invention.

FIG. 8 illustrates a three-phase "brushles" alternator 210 constructed in accordance with another embodiment of the present invention. Alternator 210 includes a stationary magnetic excitation core 211 of E-shaped cross-sectional configuration, comprising a central tubular coil support 212 with an integral base 213 extending radially from one end of coil support 212 and an integral annular flange 214 extending axially from the outer rim of base 213, in coaxial encompassing relation to the central tubular coil support 212. Thus, core elements 212-214 define an annular coil-receiving cavity 215 encircling the central coil support 212.

A DC excitation coil 216 is mounted in cavity 215, on the central coil support 212. External leads for coil 216 may be brought out through the base 213 of core 211; there is no need for slip-rings or brushes, since core 211 and coil 216 are both stationary.

Two ball bearings 221 and 222 are mounted in the opposite ends of the central aperture of coil support 212. Other types of bearings can be used; at least one of the two bearings should carry a thrust load. A shaft 223 is journalled in bearings 221 and 222; shaft 223 extends axially through coil support 212. One end 224 of shaft 223 projects outwardly of core 211. A pulley or other suitable drive connection may be mounted on the outboard end 224 of shaft 223.

The magnetic excitation structure of alternator 210 (FIG. 8) includes a first rotor member 231, a disc of magnetic material which is affixed to the end of shaft 223 opposite the base 213 of core 211. Rotor member 231 is secured to the shaft by a screw 232 and a retainer 234 that engages a hub 233 on the rotor member. As in the previous embodiment rotor member 231 includes a number of integral, radially projecting rotor poles exemplified by the pole 241. As before, the number of rotor poles is not critical.

Alternator 210 further comprises a second rotor member 251, which includes a continuous ring 252 of magnetic material having a plurality of integral, axially projecting rotor poles exemplified by pole 261. The second set of rotor poles corresponds in number to the first set. The poles on rotor member 231 are disposed in spaced interleaved relation, one-for-one, with the poles of rotor member 251. Non-magnetic mounting means are provided for mounting the second rotor member 251 on the first rotor member 231 for rotation therewith. In the illustrated construction, this non-magnetic mounting means comprises a continuous ring 267 interlocking the two rotor members.

The continuous ring 252 of rotor member 251 is concentrically aligned with the core flange 214 across a large-area radial air gap A'. The inner surface of ring 252 and the outer surface of flange 214 should be machined to tolerances close enough to avoid substantial variations in the air gap A'. On the other hand, because of the large area of the air gap A' the machining tolerances are not so critical as to add materially to the cost of manufacture of alternator 210.

Alternator 210 further comprises a stator 281, which includes an annular core 282 having a plurality of stator poles projecting therefrom. An output winding 285, corresponding to winding 85 (see FIG. 5) is mounted in stator core 82.

Stator 281 is fixedly mounted on the excitation core 211 in spaced concentric relation to the rotor poles 241 and 261-66. Two housing members 291 and 292 are affixed to the magnetic stator core 282. Housing member 291 constitutes a cover for one end of alternator 210. Housing member 292, on the other hand, extends over and is secured to the rim of base 213 of core 211, and thus mounts the stator on the core.

The performance of alternator 210 is essentially similar to that for alternator 10, and hence need not be discussed in detail. The principal difference between the two alternators is that the air gap A' for alternator 210, serving rotor member 251, is around the outside of flange 214 of the stationary magnetic core 211 instead of on the inside of the core flange.

It will be recognized that substantial revisions can be made in the alternator structures as described above without departing from the present invention. For example, the relationship of the stator and the rotor can be reversed, extending the rotor poles axially outwardly and locating the stator inside the rotor instead of around the rotor. An axial rotor-stator air gap can be used, instead of the illustrated radial gap constructions. Moreover, the winding configuration illustrated in FIG. 5 can be modified to employ coils, in each winding section, that extend only in a clockwise or only in a counterclockwise direction, in a manner similar to that illustrated in FIG. 4B.

I claim:

1. A three-phase dynamoelectric machine, of the kind comprising a rotor having two sets of oppositely polarized magnetic rotor poles interleaved with each other in an annular array, and a stator core of high-permeability magnetic material having a plurality of stator teeth separated from each other by a corresponding plurality of stator slots, the stator teeth forming an annular array concentric with the rotor poles and displaced therefrom by an air gap, the machine further including an electrical stator winding comprising:

first, second and third winding sections, each winding section including a given number of electrically conductive coils mounted in the stator slots, each coil encompassing just two stator teeth and separated from the next adjacent coil in the same winding section by at least one stator tooth not encompassed by a coil of that winding section, each winding section being angularly displaced around the stator core relative to each of the other two winding sections.

2. A three-phase dynamoelectric machine, according to claim 1, in which adjacent coils in each winding section are wound in opposite directions, as mounted in the stator core, and are separated from each other by just one stator tooth.

3. A three-phase dynamoelectric machine, according to claim 2, in which each rotor pole has an effective circumferential width of approximately two stator teeth.

4. A three-phase dynamoelectric machine, according to claim 2, in which each rotor pole is of tapered construction, having a width W1 at one edge of the magnetic stator approximately equal to the total width of two stator teeth and one slot, and having a width W2 at the other edge of the magnetic stator approximately equal to the total width of two stator teeth and three slots, so that each rotor pole is in registry with a total stator tooth area of approximately two stator teeth for any angular orientation of the rotor relative to the stator.

5. A three-phase dynamoelectric machine, according to claim 4, in which each rotor pole is spaced from the next adjacent rotor pole of opposite polarity by a distance D approximately equal to the total width of one stator tooth and one slot, so that any stator tooth is in registry with only one rotor pole for any angular orientation of the rotor relative to the stator.

6. A three-phase dynamoelectric machine, according to claim 2, in which each rotor pole has an effective width W equal to at least the total width of two stator teeth and one slot, and is spaced from the next adjacent rotor pole of opposite polarity by a distance D of at least the total width of one stator tooth and one stator slot, the sum of W plus D being equal to the total width of three stator teeth plus three stator slots.

7. A three-phase dynamoelectric machine, of the kind comprising a rotor having two sets of oppositely polarized magnetic rotor poles interleaved with each other in an annular array, a stator core of high-permeability magnetic material having a plurality of stator teeth, separated from each other by a corresponding plurality of stator slots, forming an annular array concentric with the rotor poles and displaced therefrom by an air gap, and an electrical stator winding including three winding sections each comprising a given number of interconnected coils mounted in the stator slots, each winding section being annularly displaced around the stator core relative to each of the other two winding sections, in which each rotor pole has an effective width W equal to at least the total width of two stator teeth and one slot, and is spaced from the next adjacent rotor pole of opposite polarity by a distance D of at least the total width of one stator tooth and one stator slot, the sum of W plus D being equal to the total width of three stator teeth plus three stator slots.

8. A three-phase dynamoelectric machine, according to claim 7, in which each rotor pole is of tapered construction, having a width W1 at one edge of the magnetic stator approximately equal to the total width of two stator teeth and one slot, and having a width W2 at the other edge of the magnetic stator approximately equal to the total width of two stator teeth and three slots, so that each rotor pole is in registry with a total stator tooth area of approximately two stator teeth for any angularly orientation of the rotor relative to the stator.

9. A three-phase dynamoelectric machine, according to claim 8, in which each rotor pole is spaced from the next adjacent pole of opposite polarity by a circumferential distance D approximately equal to the total circumferential width of one stator tooth and one slot, so that any stator tooth is in registry with only one rotor pole for any angular orientation of the rotor relative to the stator.

10. A three-phase alternator comprising:
- a stationary magnetic excitation core of E-shaped cross-sectional configuration, including a central tubular coil support, an integral base projecting radially from one end of the coil support, and an annular flange extending axially from the outer rim of the base, in coaxial relation to the coil support, defining an annular coil-receiving cavity;
- an exciting coil mounted on the coil support within the coil-receiving cavity;
- a rotatable shaft of magnetic material extending axially through and journalled within the coil support;
- a first rotor member comprising a disc of magnetic material affixed to the end of the shaft opposite the base of the excitation core and having a plurality of radially projecting rotor poles;
- a second rotor member comprising a continuing ring of magnetic material having a corresponding plurality of axially projecting rotor poles disposed in spaced interleaved relation, one-for-one, with the poles of the first rotor member, the ring of the second rotor member being concentrically aligned with the core flange across a large-area radial air gap;
- non-magnetic mounting means for mounting the second rotor member on the first rotor member for rotation therewith;
- and a stator, including an annular magnetic stator core having a plurality of stator teeth projecting therefrom, and three output winding sections mounted on the stator core, in slots between the stator teeth, the stator being mounted on the excitation core in spaced concentric relation to the rotor poles.

11. A three-phase alternator, according to claim 10, in which the ring portion of the second rotor member is positioned within the coil-receiving cavity of the stationary core, between the coil and the core flange.

12. A three-phase alternator, according to claim 10, in which the ring portion of the second rotor member is positioned outside the coil-receiving cavity of the stationary core, around the periphery of the core flange.

13. A three-phase alternator, according to claim 10, in which each output winding section includes a given number of coils, each coil encompassing just two stator teeth and separated from the next adjacent coil in the same output winding section by one unwound stator tooth, and in which each rotor pole has an effective circumferential width of approximately two stator teeth.

14. A three-phase alternator, according to claim 13, in which each rotor pole has an effective width W equal to at least the total width of two stator teeth and one slot, and is spaced from the next adjacent rotor pole of opposite polarity by a distance D of at least the total width of one stator tooth and one stator slot, the sum of W plus D being equal to the total width of three stator teeth plus three stator slots.

15. A three-phase alternator, according to claim 13, in which each rotor pole is of tapered construction, having a width $W1$ at one edge of the magnetic stator approximately equal to the total width of two stator teeth and one slot, and having a width $W2$ at the other edge of the magnetic stator approximately equal to the total width of two stator teeth and three slots, so that each rotor pole is in registry with a total stator tooth area of approximately two stator teeth for any angular orientation of the rotor relative to the stator.

16. A three-phase alternator, according to claim 15, in which each rotor pole is spaced from the next adjacent pole of opposite polarity by a distance D approximately equal to the total width of one stator tooth and one slot, so that any stator tooth is in registry with only one rotor pole for any angular orientation of the rotor relative to the stator.

17. A three-phase alternator including a rotor and a stator,
- the rotor comprising a given number of magnetic rotor poles of one polarity interleaved one-for-one with a like number of rotor poles of opposite polarity,
- the stator comprising an annular core having a number of stator teeth extending therefrom and separated by an equal number of winding slots, the number of stator teeth being equal to three times the total number of rotor poles,
- an output winding, in the stator slots, comprising three winding sections, each winding section including a plurality of series-connected coils with each coil encompassing two stator teeth and having a non-wound stator tooth between adjacent coils so that for each winding section two-thirds of the stator teeth have coils encircling them and one-third are non-wound,
- the rotor being aligned co-axially with the stator, with the rotor poles having outer surfaces facing terminal end surfaces of the stator teeth across an annular air gap,
- the outer surface of each rotor pole, in a particular angular relationship of the rotor and stator, interfacing with substantially all of the terminal end surfaces of just two stator teeth,
- and the rotor poles being spaced circumferentially so that substantially no portion of the outer surfaces of two adjacent rotor poles interface with a terminal end surface of any one stator tooth.

* * * * *